United States Patent
Lee

(10) Patent No.: US 12,007,926 B2
(45) Date of Patent: Jun. 11, 2024

(54) SWITCHING METHOD OF USB SWITCH ELEMENT FOR IN-VEHICLE HOST SYSTEM

(71) Applicant: GENESYS LOGIC, INC., New Taipei (TW)

(72) Inventor: Wei-te Lee, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 0 days.

(21) Appl. No.: 17/578,506

(22) Filed: Jan. 19, 2022

(65) Prior Publication Data
US 2022/0237136 A1 Jul. 28, 2022

(30) Foreign Application Priority Data

Jan. 26, 2021 (TW) ................................. 110102873

(51) Int. Cl.
| G06F 13/40 | (2006.01) |
| G06F 13/42 | (2006.01) |
| H04L 12/40 | (2006.01) |
| H04W 88/06 | (2009.01) |

(52) U.S. Cl.
CPC ...... *G06F 13/4022* (2013.01); *G06F 13/4282* (2013.01); *H04L 12/40045* (2013.01); *G06F 2213/0042* (2013.01); *H04L 2012/40273* (2013.01); *H04W 88/06* (2013.01)

(58) Field of Classification Search
CPC ............. G06F 13/4022; G06F 13/4282; G06F 2231/0042; H04L 12/40025; H04L 2012/40273; H04W 88/06
See application file for complete search history.

(56) References Cited

U.S. PATENT DOCUMENTS

| 6,591,310 | B1 * | 7/2003 | Johnson ................. G06F 13/387 |
| | | | 710/33 |
| 6,732,218 | B2 | 5/2004 | Overtoom et al. |
| 7,360,689 | B2 * | 4/2008 | Beenau ............... H04L 63/0861 |
| | | | 340/5.4 |
| 9,830,297 | B2 * | 11/2017 | Cappaert ............. G06F 13/4282 |
| 9,832,036 | B2 * | 11/2017 | Lieberman ........... H04L 67/025 |
| 9,910,806 | B2 | 3/2018 | Margabandu et al. |
| 10,162,788 | B2 * | 12/2018 | Shetty .................. G06F 13/4022 |
| 10,255,215 | B2 * | 4/2019 | Breakstone ............ G06F 13/16 |
| 10,289,596 | B2 * | 5/2019 | Chen .................... G06F 13/1673 |
| 10,331,604 | B2 | 6/2019 | Ghosh et al. |

(Continued)

FOREIGN PATENT DOCUMENTS

| CN | 1672139 A | 9/2005 |
| CN | 105849709 A | 8/2016 |

(Continued)

*Primary Examiner* — Henry Tsai
*Assistant Examiner* — Christopher A Bartels
(74) *Attorney, Agent, or Firm* — Rivka Friedman

(57) ABSTRACT

The present invention provides a switching method of a universal serial bus (USB) switch element for an in-vehicle host system. According to a switching command, a hub controller of a switch device controls a switch element to switch from a device mode to a host mode, so that one of multiple mobile terminals connected to the switch element is in the host mode; or alternatively, the switch element is controlled to be switched from the host mode to the device mode so that multiple peripheral devices are in the device mode.

8 Claims, 2 Drawing Sheets

(56) References Cited

U.S. PATENT DOCUMENTS

| | | | |
|---|---|---|---|
| 10,380,049 B2 | 8/2019 | Lin et al. | |
| 10,565,145 B2 | 2/2020 | Steele et al. | |
| 11,061,457 B1* | 7/2021 | Bhattacharjee | G06F 1/3215 |
| 11,114,945 B2* | 9/2021 | Ahmed | H02M 3/33592 |
| 11,119,548 B2* | 9/2021 | Venkideswaran | G06F 1/26 |
| 11,132,323 B2* | 9/2021 | Srivastava | G06F 13/4045 |
| 11,176,072 B2 | 11/2021 | Voto et al. | |
| 11,223,270 B2* | 1/2022 | Rajesh | H02M 3/33523 |
| 11,379,398 B2* | 7/2022 | Curtis | G06F 13/4068 |
| 11,545,824 B2* | 1/2023 | Buhari | G06F 13/4282 |
| 2009/0210608 A1 | 8/2009 | Chang et al. | |
| 2013/0082662 A1* | 4/2013 | Carre | H02J 7/00 320/134 |
| 2013/0198737 A1* | 8/2013 | Ricci | B60R 25/01 717/174 |
| 2013/0198802 A1* | 8/2013 | Ricci | H04L 67/12 726/28 |
| 2013/0200991 A1* | 8/2013 | Ricci | B60K 35/00 340/4.3 |
| 2013/0203400 A1* | 8/2013 | Ricci | H04M 1/72463 455/418 |
| 2013/0204466 A1* | 8/2013 | Ricci | H04L 12/6418 701/2 |
| 2013/0204484 A1* | 8/2013 | Ricci | G06F 17/00 701/29.6 |
| 2013/0204943 A1* | 8/2013 | Ricci | G06F 16/29 709/204 |
| 2013/0205412 A1* | 8/2013 | Ricci | G06F 3/0484 726/29 |
| 2013/0227648 A1* | 8/2013 | Ricci | H04W 12/088 726/3 |
| 2016/0247331 A1* | 8/2016 | Cacabelos | G07C 5/0808 |
| 2018/0052799 A1* | 2/2018 | Shetty | G06F 13/4022 |
| 2018/0181531 A1* | 6/2018 | Foust | G06F 13/36 |
| 2018/0285832 A1* | 10/2018 | Oz | G07C 5/008 |
| 2019/0102171 A1* | 4/2019 | Tashiro | G06F 9/3016 |
| 2020/0119540 A1* | 4/2020 | Buhari | H03K 17/08122 |
| 2020/0389469 A1* | 12/2020 | Litichever | H04L 63/029 |
| 2021/0208648 A1* | 7/2021 | Venkideswaran | H02J 7/007192 |
| 2021/0208654 A1* | 7/2021 | Bhattacharjee | H02J 1/106 |
| 2022/0046114 A1* | 2/2022 | Entelis | H04L 69/08 |

FOREIGN PATENT DOCUMENTS

| | | |
|---|---|---|
| CN | 108009108 A | 5/2018 |
| JP | 2016218972 A | 12/2016 |
| TW | 200935226 A | 8/2009 |
| TW | 201546621 A | 12/2015 |
| TW | 201800954 A | 1/2018 |
| TW | 201901455 A | 1/2019 |

* cited by examiner

SWITCHING METHOD OF USB SWITCH ELEMENT FOR IN-VEHICLE HOST SYSTEM

CROSS-REFERENCE TO RELATED APPLICATION

This application claims the priority benefit of TW application serial No. 110102873, filed on Jan. 26, 2021. The entirety of the above-mentioned patent application is hereby incorporated by reference herein and made a part of specification.

FIELD OF DISCLOSURE

The present invention relates to a switching method and in particular, to a switching method of a universal serial bus (USB) switch element for an in-vehicle host system.

DESCRIPTION OF RELATED ART

With rapid development of communication technology and information technology, in-vehicle host systems usually integrate mobile phones, navigation, music playing functions, and audio-visual playing functions. This allows automobile manufacturers to create various functional operating interfaces for drivers to facilitate the safe use of information, entertainment, navigation, and other services. In conventional techniques, the in-vehicle host system can only provide one communication device (such as a mobile phone), and this communication device communicates in a host mode with the in-vehicle host system, so that different applications in the communication device can be displayed on the in-vehicle host system, which facilitates operations and communications of the drivers. However, the in-vehicle host system cannot switch between two communication devices, which makes it difficult for users with two different communication devices to control the in-vehicle host system by using the host mode of the in-vehicle host system. In view of this, there is a need to develop a new switching method to improve the above problems.

SUMMARY

It is an objective of the present invention to provide a switching method of a universal serial bus (USB) switch element for an in-vehicle host system. A switch device enables the in-vehicle host system to switch between multiple mobile terminals, so that users with multiple different mobile terminals can easily control the in-vehicle host system by using a host mode of the in-vehicle host system.

Accordingly, the present invention provides a switching method of a universal serial bus (USB) switch element for an in-vehicle host system, comprising following steps:
an in-vehicle host device initializes a switch device;
the in-vehicle host device transmits a switching command to the switch device via a host port;
the switch device receives the switching command; and
according to the switching command, a hub controller of the switch device controls the switch element to switch from a device mode to a host mode, so that one of a plurality of mobile terminals connected to the switch element is in the host mode, or alternatively the switch element is controlled to switch from the host mode to the device mode, so that a plurality of peripheral devices connected to the hub device are in the device mode;
wherein the device mode is a state in which the in-vehicle host device controls the peripheral devices through a hub device; the host mode is a state in which any one of the mobile terminals controls the in-vehicle host device during the host mode; and when the switch device is in the host mode, the hub device disables the peripheral devices.

In one embodiment of the present invention, the step where the in-vehicle host device initializes the switch device further comprises following steps:
the in-vehicle host device sets the switch device in the device mode to communicate with the hub controller of the hub device; and
the in-vehicle host device detects a voltage level of a voltage pin of the host port.

In one embodiment of the present invention, the voltage pin is a VBUS voltage pin.

In one embodiment of the present invention, before the step where the in-vehicle host device transmits the switching command to the switch device via the host port, the in-vehicle host device resets a VBUS voltage level of the VBUS voltage pin to increase from zero to a predetermined level.

In one embodiment of the present invention, when the switch device is in the device mode or the host mode, the hub device enables the mobile terminals to be in a rechargeable state.

In one embodiment of the present invention, a plurality of charge controllers are coupled between the switch element and the mobile terminals to control charging between the in-vehicle host device and each of the mobile terminals.

In one embodiment of the present invention, a plurality of peripheral controllers are coupled between the hub device and the peripheral devices to control a communication link between the in-vehicle host device and each of the peripheral devices.

In one embodiment of the present invention, the mobile terminals comprise a first mobile terminal and a second mobile terminal, and the hub controller controls the switch element to switch from the host mode of the first mobile terminal to the host mode of the second mobile terminal according to the switching command.

In one embodiment of the present invention, when one of the first mobile terminal and the second mobile terminal is in the host mode, one of the first mobile terminal and the second mobile terminal transmits data or a control command to the in-vehicle host device through the switch element to control operations of the in-vehicle host device.

BRIEF DESCRIPTION OF DRAWINGS

In order to explain the technical solutions of the present invention more clearly, drawings which will be described in the embodiments are briefly introduced hereinafter. Obviously, the accompanying drawings described below are only some embodiments of the present invention. Persons of ordinary skills in the art are able to obtain other drawings based on these drawings.

DETAILED DESCRIPTION OF EMBODIMENTS

In the accompanying drawings, same symbols/numerals are used to indicate same components or similar components. Working principles of the present invention are described as being implemented in an appropriate computing environment as an example. The following description is provided with reference to specific embodiments of the present invention, and should not be construed as limiting other specific embodiments of the present invention that are not described in detail herein.

Figure 1:
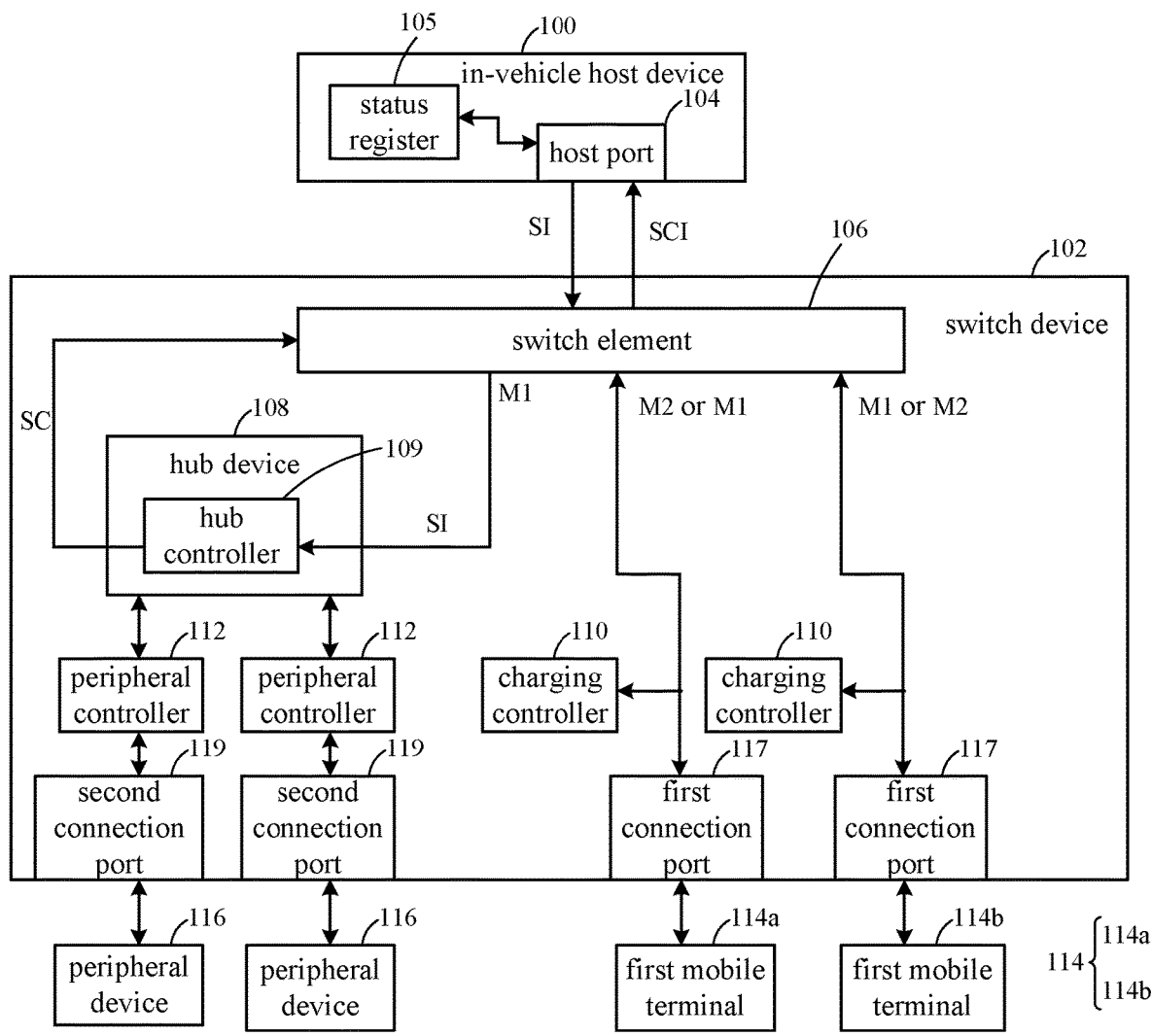
FIG. 1 is a diagram showing an in-vehicle host system with a universal serial bus (USB) switch element according to one embodiment of the present invention.
Figure 2:
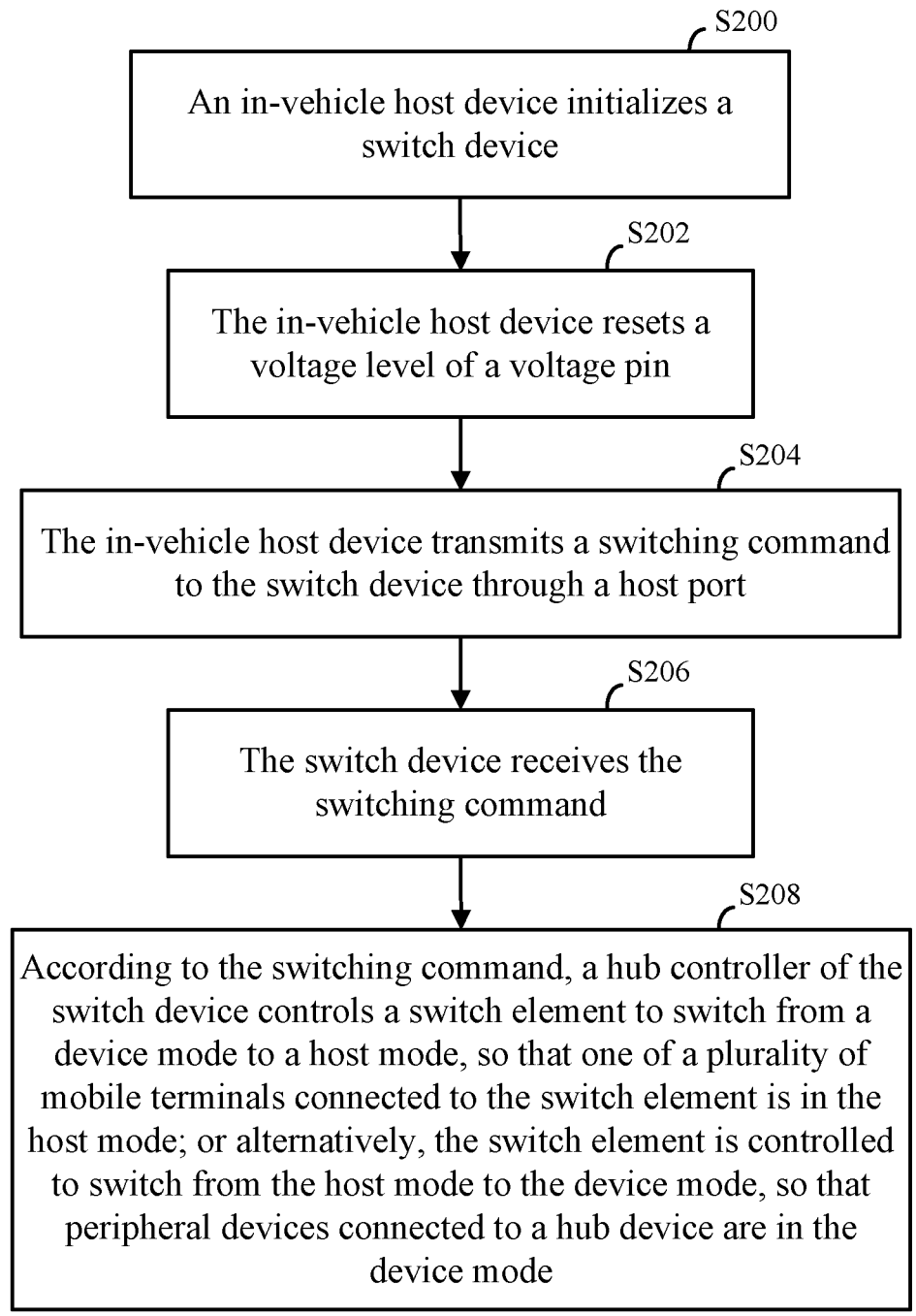
FIG. 2 is a process flow diagram illustrating a switching method of the USB switch element for the in-vehicle host system according to one embodiment of the present invention.

Referring to FIG. 1, it illustrates an in-vehicle host system with a universal serial bus (USB) switch element according to one embodiment of the present invention. The in-vehicle host system comprises an in-vehicle host device 100 and a switch device 102. The in-vehicle host device 100 is configured to initialize the switch device 102, and the in-vehicle host device 100 transmits a switching command SI to the switch device 102 through a host port 104, wherein the host port 104 is provided with a voltage pin, so that the in-vehicle host device 100 can detect a voltage level of the voltage pin. The in-vehicle host device 100 and the switch device 102 of the present invention are compatible with a USB protocol. The in-vehicle host device 100 of the present invention is configured to switch between different mobile terminals 114 such as mobile phones. As shown in FIG. 2, the mobile terminals 114 comprise a first mobile terminal 114a and a second mobile terminal 114b, but the present application is not limited in this regard. The in-vehicle host device 100 of the in-vehicle host system is controlled by the mobile terminal 114 switched to, so that an operating interface of an application program of the mobile terminal 114 is displayed on a display (not illustrated) of the in-vehicle host device 100.

As shown in FIG. 1, the switch device 102 is coupled to the in-vehicle host device 100 for receiving the switching command SI. The switch device 102 comprises a switch element 106, a hub device 108, a plurality of charging controllers 110, and a plurality of peripheral controllers 112. The switch element 106 is coupled to the host port 104 of the in-vehicle host device 100, the hub device 108 is coupled to the switch element 106, the charging controllers 110 are coupled between the switch element 106 and the mobile terminals 114, and the peripheral controllers 112 are coupled between the hub device 108 and peripheral devices 116. In one embodiment, each of the charging controllers 110 is connected to a corresponding one of the mobile terminals 114 through a first connection port 117, and each of the peripheral controllers 112 is connected to a corresponding one of the peripheral devices 116 through a second connection port 119. In one embodiment, the switch element 106 is, for example, a multiplexer under control of the hub device 108.

In FIG. 1, the switch element 106 receives the switching command SI and is configured to switch between a device mode M1 and a host mode M2, wherein the device mode M1 is defined as a state in which the in-vehicle host device 100 can control the peripheral devices 116 through the hub device 108, so that the peripheral devices 116 execute commands or programs sent by the in-vehicle host device 100. The host mode M2 is defined as a state in which any one of the mobile terminals 114 can control the in-vehicle host device 100 during the host mode M2, so that the in-vehicle host device 100 can execute commands or programs sent by the mobile terminal 114. The hub device 108 comprises a hub controller 109. The hub controller 109 controls the switch element 106 to switch from the device mode M1 to the host mode M2 according to the switching command SI, e.g., a control command SC, so that one of the mobile terminals 114 connected to the switch element 106 is in the host mode M2; or alternatively, the hub controller 109 controls the switch element 106 to switch from the host mode M2 to the device mode M1 according to the switching command SI, e.g., the control command SC, so that the peripheral devices 116 connected to the hub device 108 is in the device mode M1. The charging controllers 110 are used to control charging between the in-vehicle host device 100 and the mobile terminals 114. Each of the peripheral controllers 112 is configured to control a communication link between the in-vehicle host device 100 and a corresponding one of the peripheral devices 116. It should be noted that any one of the mobile terminals 114 of the present invention can also be in the device mode M1, and it is preferable that only one of the mobile terminals 114 of the present invention is in the host mode M2.

With reference to FIGS. 1 and 2, FIG. 2 is a process flow diagram illustrating a switching method of the USB switch element for the in-vehicle host system according to one embodiment of the present invention. The switching method comprises following steps:

In step S200, the in-vehicle host device 100 initializes the switch device 102. In one embodiment, the step where the in-vehicle host device 100 initializes the switch device 102 further comprises following steps: the in-vehicle host device 100 sets the switch device 102 in the device mode M1 to communicate with the hub controller 109 of the hub device 108. In one embodiment, information of the initialized device mode M1 can be stored in a status register 105; and the in-vehicle host device 100 detects a voltage level of a voltage pin of the host port 104. In one embodiment, the voltage pin is a VBUS voltage pin.

In step S202, the in-vehicle host device 100 resets the voltage level of the voltage pin. In one embodiment, the in-vehicle host device 100 resets a VBUS voltage level of the VBUS voltage pin to increase from zero to a predetermined level. In other words, before switching between the device mode M1 and the host mode M2, the in-vehicle host device 100 first resets the VBUS voltage level. For example, the VBUS voltage level is reset to zero and is raised by the predetermined level to perform the subsequent switching between the device mode M1 and the host mode M2.

In step S204, the in-vehicle host device 100 transmits the switching command SI to the switch device 102 through the host port 104 to control the switch device 102 to switch between the mobile terminals 114 and the peripheral devices 116. The host port 104 is, for example, a USB OTG (on-the-go) port.

In step S206, the switch device 102 receives the switching command SI. The switching command SI is compatible with the USB protocol, for example.

In step S208, the hub controller 109 of the switch device 102 controls the switch element 106 to switch from the device mode M1 to the host mode M2 according to the switching command SI, e.g., the control command SC, so that one of the mobile terminals 114 (e.g., the first mobile terminal 114a or the second mobile terminal 114b) connected to the switch element 106 is in the host mode M2; or alternatively, the switch element 106 is controlled to switch from the host mode M2 to the device mode M1, through the control command SC for example, so that the peripheral devices 116 connected to the hub device 108 are in the device mode M1. The device mode M1 is defined as the state where the in-vehicle host device 100 can control the peripheral devices 116 through the hub device 108. The host mode M2 is defined as the state where any one of the mobile terminals 114 is in the host mode M2 and can control the in-vehicle host device 100. When the switch device 102 is in the host mode M2, the hub device 108 disables the peripheral devices. It should be noted that any one of the mobile terminals 114 of the present invention can also be in the device mode M1, and it is preferable that the present invention sets only one of the mobile terminals 114 to be in the host mode M2.

In step S208 according to one embodiment, when the switch device 102 is in the device mode M1 or the host mode M2, the hub device 108 enables the mobile terminals 114 to be chargeable. The charging controllers 110 are coupled between the switch element 106 and the mobile terminals 114 to control the charging between the in-vehicle host device 100 and the mobile terminals 114. In one embodiment, the peripheral controllers 112 are coupled between the hub device 108 and the peripheral devices 116 to control the communication link between the in-vehicle host device 100 and each of the peripheral devices 116.

In step S208 according to one embodiment, the mobile terminals 114 comprise a first mobile terminal 114a and a second mobile terminal 114b, and the hub controller 109 controls the switch element 106 to switch from the host mode M2 of the first mobile terminal 114a to the host mode M2 of the second mobile terminal 114b according to the switching command SI. When one of the first mobile terminal 114a and the second mobile terminal 114b is in the host mode M2, one of the first mobile terminal 114a and the second mobile terminal 114b transmits data SD or a communication command SCI to the in-vehicle host device 100 through the switch element 106 to control operations of the in-vehicle host device 100.

In summary, the switching method of the USB switch element for the in-vehicle host system of the present invention enables the in-vehicle host system to switch between multiple mobile terminals through the switch device, so that users with multiple different mobile terminals can easily control the in-vehicle host system by using the host mode of the in-vehicle host system.

Although the present invention has been disclosed as above with reference to preferable embodiments, the present invention is not limited to the above description. Persons of ordinary skills in the art can make various modifications and changes without departing from the spirit and scope of the present invention. Therefore, the protection scope of the present invention shall be defined by the appended claims.

What is claimed is:

1. A switching method between a device mode and a host mode of a universal serial bus (USB) switch element for an in-vehicle host system, comprising following steps:
    an in-vehicle host device initializes a switch device connected to the in-vehicle host device;
    the in-vehicle host device transmits a switching command to the switch device via a host port;
    the switch device receives the switching command; and
    according to the switching command, a hub controller included in a hub device located in the switch device controls the switch element located in the switch device to switch from a device mode to a host mode, so that one of a plurality of mobile terminals connected to the switch element is in the host mode, or alternatively the switch element is controlled to switch from the host mode to the device mode, so that a plurality of peripheral devices connected to the hub device located in the switch device are in the device mode;
    wherein the device mode is a state in which the in-vehicle host device controls the peripheral devices through the hub device; the host mode is a state in which one of the mobile terminals controls the in-vehicle host device, and the hub device, in response to the switch device is in the host mode in which the in-vehicle device is under control of the one of the mobile terminals, disables the peripheral devices;
    wherein the mobile terminals comprise a first mobile terminal and a second mobile terminal, and the hub controller, in response to that the first mobile terminal and the second mobile terminal are connected to the switch device, controls the switch element to switch from the first mobile terminal in the host mode to the second mobile terminal in the host mode according to the switching command.

2. The switching method between the device mode and the host mode of the USB switch element for the in-vehicle host system according to claim 1, wherein the step that the in-vehicle host device initializes the switch device further comprises following steps:
    the in-vehicle host device sets the switch device in the device mode to communicate with the hub controller of the hub device; and
    the in-vehicle host device detects a voltage level of a voltage pin of the host port.

3. The switching method between the device mode and the host mode of the USB switch element for the in-vehicle host system according to claim 2, wherein the voltage pin is a VBUS voltage pin.

4. The switching method between the device mode and the host mode of the USB switch element for the in-vehicle host system according to claim 3, wherein before the step that the in-vehicle host device transmits the switching command to the switch device via the host port, the in-vehicle host device resets a VBUS voltage level of the VBUS voltage pin to increase the VBUS voltage level from zero to a predetermined level.

5. The switching method between the device mode and the host mode of the USB switch element for the in-vehicle host system according to claim 1, wherein the hub device enables the mobile terminals to be in a rechargeable state.

6. The switching method between the device mode and the host mode of the USB switch element for the in-vehicle host system according to claim 5, wherein a plurality of charge controllers are coupled between the switch element and the mobile terminals to control charging from the in-vehicle host device to each of the mobile terminals.

7. The switching method between the device mode and the host mode of the USB switch element for the in-vehicle host system according to claim 1, wherein a plurality of peripheral controllers located in the switch device are coupled between the hub device and the peripheral devices to control a communication link between the in-vehicle host device and each of the peripheral devices.

8. The switching method between the device mode and the host mode of the USB switch element for the in-vehicle host system according to claim 1, wherein one of the first mobile terminal and the second mobile terminal is in the host mode, and the one of the first mobile terminal and the second mobile terminal in the host mode transmits data or a control command to the in-vehicle host device through the switch element to control operations of the in-vehicle host device.

* * * * *